US012763649B2

(12) United States Patent
Shimizu et al.

(10) Patent No.: US 12,763,649 B2
(45) Date of Patent: Oct. 13, 2026

(54) MOTOR CONTROL DEVICE

(71) Applicant: MITSUBA Corporation, Gunma (JP)

(72) Inventors: Nobuhiro Shimizu, Gunma (JP); Yasufumi Noguchi, Gunma (JP); Hikaru Sawada, Gunma (JP); Hiroaki Hiruma, Gunma (JP)

(73) Assignee: MITSUBA Corporation, Gunma (JP)

( * ) Notice: Subject to any disclaimer, the term of this patent is extended or adjusted under 35 U.S.C. 154(b) by 101 days.

(21) Appl. No.: 18/856,878

(22) PCT Filed: Mar. 5, 2024

(86) PCT No.: PCT/JP2024/008358
§ 371 (c)(1),
(2) Date: Oct. 14, 2024

(87) PCT Pub. No.: WO2025/069497
PCT Pub. Date: Apr. 3, 2025

(65) Prior Publication Data

US 2026/0155715 A1 Jun. 4, 2026

(30) Foreign Application Priority Data

Sep. 29, 2023 (JP) ................................ 2023-169778

(51) Int. Cl.
*H02K 11/33* (2016.01)

(52) U.S. Cl.
CPC ......... *H02K 11/33* (2016.01); *H02K 2203/03* (2013.01); *H02K 2211/03* (2013.01)

(58) Field of Classification Search
CPC . H02K 11/33; H02K 2203/03; H02K 2211/03
See application file for complete search history.

(56) References Cited

U.S. PATENT DOCUMENTS

2008/0297138 A1 12/2008 Taylor et al.
2012/0063187 A1 3/2012 Sato et al.
2017/0325341 A1 * 11/2017 Ogane .................... H02G 3/105

FOREIGN PATENT DOCUMENTS

JP 2012037298 2/2012
JP 2014035322 2/2014
(Continued)

OTHER PUBLICATIONS

"International Search Report (Form PCT/ISA/210) of PCT/JP2024/008358", mailed on Apr. 9, 2024, , pp. 1-3.
(Continued)

*Primary Examiner* — Sean Gugger
(74) *Attorney, Agent, or Firm* — JCIPRNET

(57) ABSTRACT

A motor control device includes a base block 20, a pillar portion 13A, a substrate, an electrode for current conduction, and a magnetic detection element. At least a part of the power control circuit is configured on the base block 20. The pillar portion 13A protrudes from the base block 20. The substrate is fixed to the base block 20 through the pillar portion 13A. The electrode for current conduction is connected to the power control circuit. The magnetic detection element is attached to a position proximate to the electrode of the substrate and configured to detect a magnetic field caused by a current flowing through the electrode. The magnetic detection element is configured in a vicinity of a support portion by the pillar portion 13A at an end portion in its extending direction of the substrate.

6 Claims, 3 Drawing Sheets

(56) References Cited

FOREIGN PATENT DOCUMENTS

| | | |
|---|---|---|
| JP | 2015001477 | 1/2015 |
| JP | 2020183927 | 11/2020 |
| WO | 2016060046 | 4/2016 |
| WO | 2020059453 | 3/2020 |

OTHER PUBLICATIONS

"Written Opinion of the International Searching Authority (Form PCT/ISA/237) of PCT/JP2024/008358," mailed on Apr. 9, 2024, with English translation thereof, pp. 1-6.

* cited by examiner

MOTOR CONTROL DEVICE

CROSS-REFERENCE TO RELATED APPLICATION

This application is a 371 application of the International PCT application serial no. PCT/JP2024/008358, filed on Mar. 5, 2024, which claims the priority benefits of Japan Patent Application No. 2023-169778, filed on Sep. 29, 2023. The entirety of each of the above-mentioned patent applications is hereby incorporated by reference herein and made a part of this specification.

TECHNICAL FIELD

The present invention relates to a motor control device.

RELATED ART

As a motor control device, one that converts direct current power supplied from a battery into alternating current power and drives a motor with the converted alternating current power is known. In this type of motor control device, it is necessary to accurately detect the input current value from the battery and the output current value to the motor, and to control each part based on these detected current values. As a countermeasure for this, a device is known in which a current sensor is installed in the vicinity of an electrode (bus bar) for current conduction connected to the power control circuit (for example, see Patent Document 1).

The current sensor described in Patent Document 1 has a magnetic core and a Hall element (magnetic detection element) configured in the vicinity of an electrode (bus bar) for current conduction connected to the power control circuit. This current sensor is designed to amplify the magnetic field generated due to the current flowing through the bus bar by means of the magnetic core, and to detect the magnetic field amplified by the magnetic core using the Hall element.

CITATION LIST

Patent Document

[Patent Document 1] Japanese Patent Application Laid-Open (JP-A) No. 2012-37298.

SUMMARY

Technical Problem

Since the current sensor described in Patent Document 1 has a structure in which a magnetic core and a Hall element are configured in the vicinity of an electrode (bus bar) for current conduction, due to the inclusion of the magnetic core, the overall device becomes larger, and the manufacturing cost also increases.

As a countermeasure for this, in recent years, consideration has been given to detecting the magnetic field generated in the vicinity of the electrode using only magnetic detection elements such as Hall elements without providing a magnetic core. However, in this case, even if the magnetic detection element is brought sufficiently close to the electrode, the detected current value fluctuates greatly due to slight changes in the separation distance between the magnetic detection element and the electrode. Thus, in the case of using a motor control device in equipment where large vibration input is expected, such as in vehicles, there is concern that the detection accuracy of the current flowing through the electrode may decrease.

Thus, the present invention aims to provide a motor control device that may suppress fluctuations in the separation distance between the electrode, which is the detection target, and the magnetic detection element.

Solution to Problem

To solve the above problem, the motor control device according to the present invention adopts the following configuration. That is, the motor control device of the first aspect of the present invention includes: a base block, on which at least a part of a power control circuit is configured; a pillar portion, protruding from the base block; a substrate, fixed to the base block through the pillar portion; an electrode for current conduction, connected to the power control circuit; and a magnetic detection element, attached to a position proximate to the electrode of the substrate and configured to detect a magnetic field caused by a current flowing through the electrode. The magnetic detection element is configured in a vicinity of a support portion by the pillar portion at an end portion in an extending direction of the substrate.

In the motor control device of this configuration, the end portion in the extending direction of the substrate is supported by the base block through the pillar portion. When there is vibration input externally, the substrate tends to have a large amplitude in the central region. In contrast, the support portion by the pillar portion at the end portion in the extending direction of the substrate is easily suppressed from vibrating by the pillar portion and does not vibrate with a large amplitude even when there is vibration input externally. Thus, the magnetic detection element configured in the vicinity of the support portion by the pillar portion at the end portion in the extending direction of the substrate does not vibrate significantly even when there is vibration input externally. Consequently, in the case of adopting this configuration, fluctuations in the separation distance between the electrode and the magnetic detection element are suppressed.

The motor control device of the second aspect of the present invention, in the motor control device of the first aspect, includes the electrode that is constituted by a plate-shaped bus bar fixed to the base block, and a part of the bus bar is provided with a bending portion that is bent to be proximate to the magnetic detection element.

In this case, even if the separation distance between the fixing portion of the bus bar and the substrate is large, by bringing the bending portion provided on the bus bar close to the substrate side, the separation distance between the bus bar (electrode), which is the detection target, and the magnetic detection element may be sufficiently narrowed.

The motor control device of the third aspect of the present invention, in the motor control device of the first or second aspect, includes a plurality of electrodes, and a plurality of magnetic detection elements are provided in a single row along one edge in the extending direction of the substrate, and the one edge of the substrate is fixed to the base block through a plurality of the pillar portions.

In this case, one edge of the substrate is supported on the base block by a plurality of pillar portions, thereby increasing the rigidity of the one edge of the substrate. Since a plurality of magnetic detection elements are arranged in a single row along this one edge of the substrate with increased rigidity, fluctuations in the separation distance between the plurality of electrodes and the corresponding plurality of magnetic detection elements thereof may be efficiently suppressed.

The motor control device of the fourth aspect of the present invention, in the motor control device of the third aspect, includes the electrodes including: a pair of battery-side bus bars, connected to a battery; and three motor-side bus bars, connected to a three-phase power supply portion of a motor. The battery-side bus bars are respectively configured on outer sides in an alignment direction of the three motor-side bus bars arranged side by side, and the magnetic detection elements are configured in positions proximate to one of the battery-side bus bars and in positions proximate to each of the motor-side bus bars on outer sides in the alignment direction among the three motor-side bus bars.

In this case, the input current from the battery may be detected by the magnetic detection element configured close to one of the battery-side bus bars. Two phases of the output current of the three-phase output current of the motor may be detected by two magnetic detection elements configured close to the two motor-side bus bars on the outer sides among the three motor-side bus bars in the alignment direction. Further, the remaining one phase of the three-phase output current of the motor may be calculated based on the detection values from the two magnetic detection elements configured close to the two motor-side bus bars on the outer sides in the alignment direction. Consequently, by adopting this configuration, the input current and output currents may be reliably detected with the minimum necessary number of magnetic detection elements. Thus, by adopting this configuration, miniaturization and weight reduction of the current detection portion may be achieved.

The motor control device of the fifth aspect of the present invention, in the motor control device of the fourth aspect, includes the pillar portions that are respectively configured in a substantially middle position between one of the motor-side bus bars on the outer sides in the alignment direction and one of the battery-side bus bars adjacent to the motor-side bus bar and in a substantially middle position between other one of the motor-side bus bars on the outer sides in the alignment direction and other one of the battery-side bus bars adjacent to the motor-side bus bar.

In this case, the two pillar portions supporting one edge of the substrate may efficiently suppress fluctuations of each magnetic detection element for detecting the input current and the magnetic detection elements for detecting the output current. Consequently, by adopting this configuration, the support rigidity of the substrate may be sufficiently ensured while reducing the number of pillar portions protruding from the base block, thereby achieving further miniaturization and weight reduction of the entire device.

Effects of Invention

Since the motor control device according to the present invention includes the magnetic detection elements configured near the support portions by the pillar portions at the end portions in the extending direction of the substrate, even if there is vibration input externally, fluctuation in the separation distance between the electrodes and the magnetic detection elements may be suppressed.

DESCRIPTION OF EMBODIMENTS

Hereinafter, one embodiment of the present invention is described with reference to the drawings.

Figure 1:
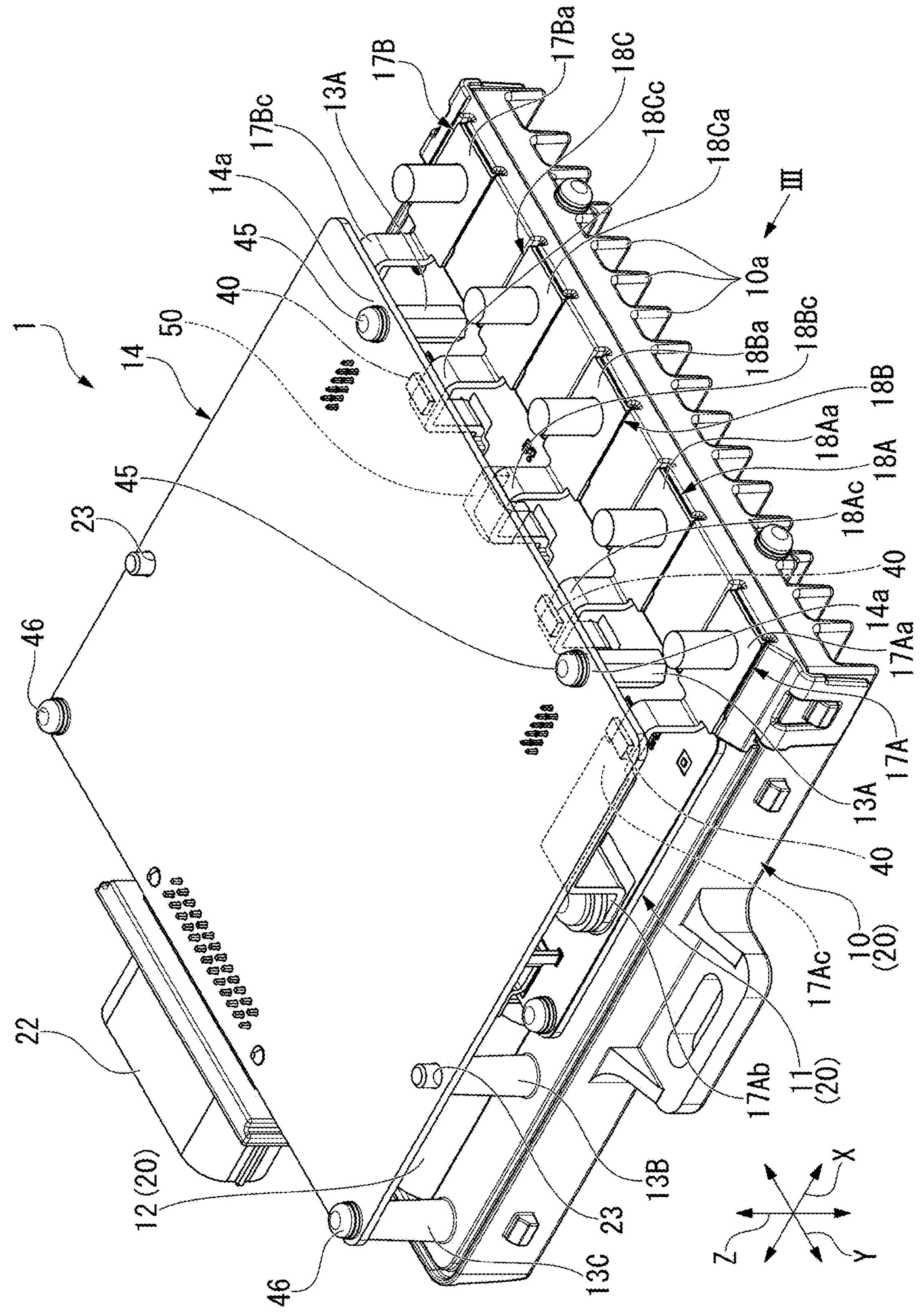
FIG. 1 is a perspective view of the motor control device according to the embodiment with the upper cover removed.
Figure 2:
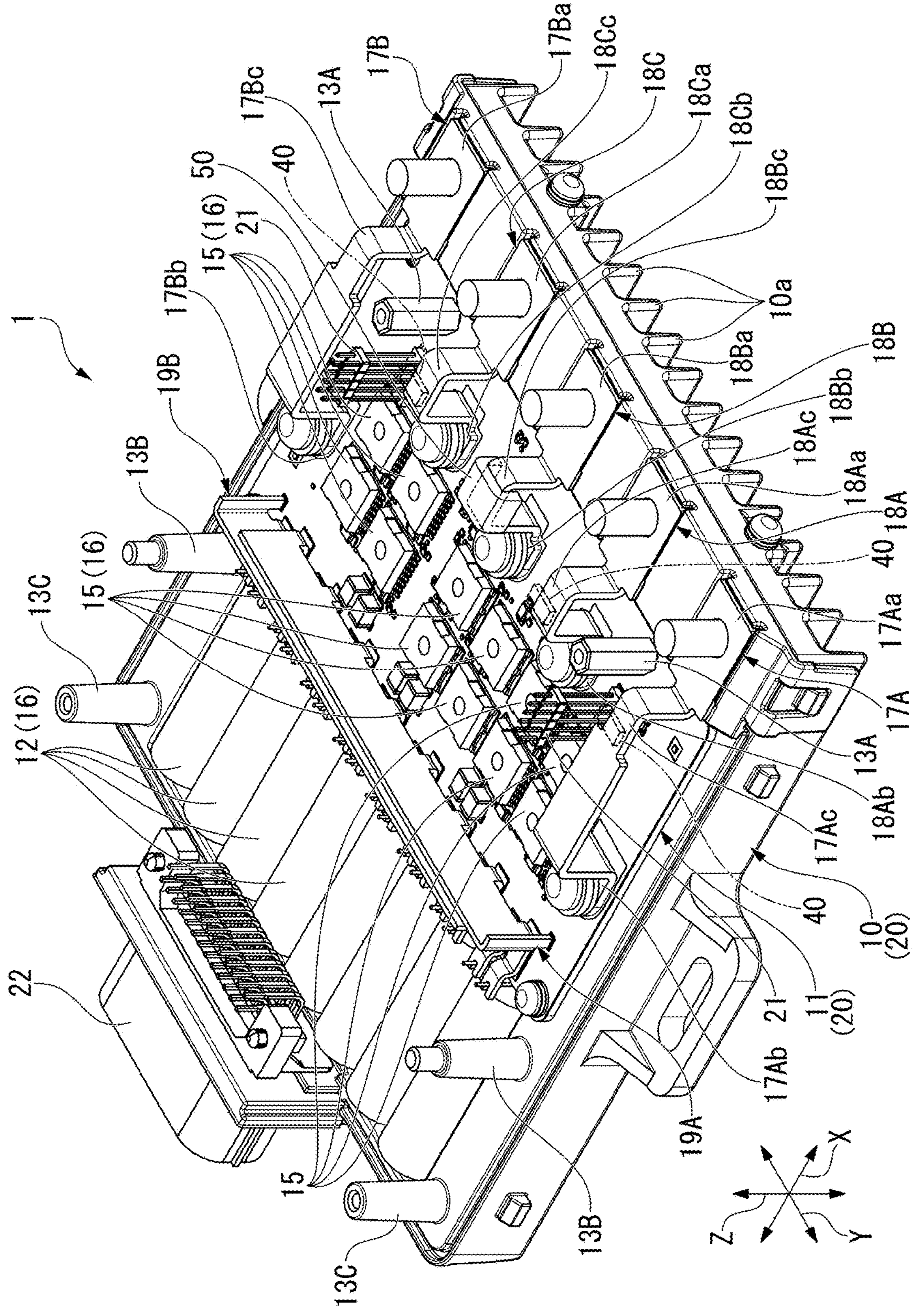
FIG. 2 is a perspective view of the motor control device according to the embodiment with the second substrate in FIG. 1 removed.
Figure 3:
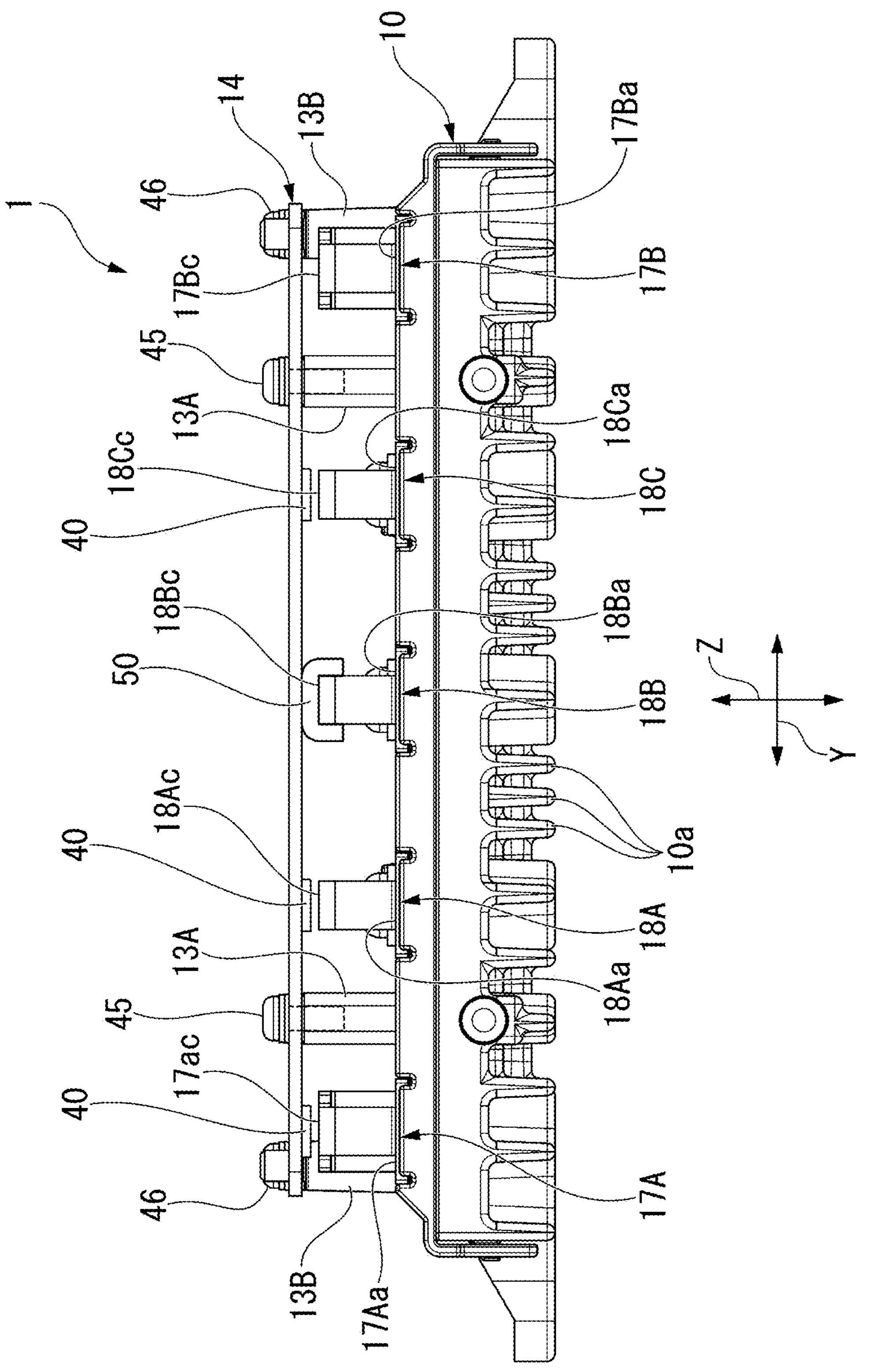
FIG. 3 is a front view of the motor control device according to the embodiment corresponding to the arrow view III in FIG. 1.

FIG. 1 is a perspective view of the motor control device 1 according to the embodiment with the upper cover removed. FIG. 2 is a perspective view of the motor control device 1 with the second substrate 14 in FIG. 1 removed. Further, FIG. 3 is a front view of the motor control device 1 corresponding to the arrow view III in FIG. 1. The motor control device 1 includes an inverter function that converts direct current power supplied from a battery (not shown) into alternating current power and drives a motor (alternating current motor) (not shown) with the converted alternating current power. The motor control device 1 includes a thin rectangular case 10 with one side open. A plurality of fins 10*a* for heat dissipation protrude from the outer surface of the case 10. For the convenience of description, the side of the case 10 with the opening is referred to as "upper," and the opposite side is referred to as "lower.

Inside the opening of the case 10, the first substrate 11 and a plurality of electrolytic capacitors 12 (see FIG. 2) are accommodated and configured. Further, a plurality of pillar portions 13A, 13B, and 13C protrude toward the upper side from the case 10. The second substrate 14 is supported on the upper portions of the plurality of pillar portions 13A, 13B, and 13C. The second substrate 14 is configured on the upper side of the first substrate 11 and the plurality of electrolytic capacitors 12, substantially parallel to the first substrate 11. As shown in FIG. 2, the first substrate 11 is accommodated and configured on one side of the interior of the substantially rectangular case 10 in plan view, and the plurality of electrolytic capacitors 12 are accommodated and configured on the other side of the interior of the case 10. Furthermore, an upper cover (not shown) is attached to the upper portion of the case 10, covering the first substrate 11, the electrolytic capacitors 12, the second substrate 14, and other components from the upper side.

The first substrate 11 is a printed wiring board (PWB) on which a plurality of electronic components, including switching elements 15, are mounted. A plurality of switching elements 15 are combined with the electrolytic capacitors 12 to constitute the main portion of the power control circuit 16. The power control circuit 16 performs ON/OFF operations through the control of the switching elements 15 by a controller (not shown), thereby converting the direct current power from the battery into three-phase alternating current power.

The power control circuit 16 is connected to a pair of battery-side bus bars 17A and 17B, which serve as electrodes for conducting electricity on the battery side, and three motor-side bus bars 18A, 18B, and 18C, which serve as electrodes for conducting electricity on the motor side. The pair of battery-side bus bars 17A and 17B are connectable to the positive and negative terminals of the battery, respectively, through connection cables (not shown). The three motor-side bus bars 18A, 18B, and 18C are connectable to the U-phase, V-phase, and W-phase power supply portions of the motor, respectively, through connection cables (not shown).

As shown in FIG. 2, the electrolytic capacitors 12 configured on the other side inside the case 10 are formed in a substantially cylindrical shape. This plurality of electrolytic capacitors 12 are configured in parallel in a direction perpendicular to the longitudinal direction thereof (axial direction). The plurality of electrolytic capacitors 12 are connected to the circuit on the first substrate 11 through connection bus bars 19A and 19B surface-mounted on the first substrate 11. It is noted that in this embodiment, the case 10 and the first substrate 11 and electrolytic capacitors 12 supported by the case 10 constitute the main portion of a base block 20. Hereinafter, the direction along the longitudinal direction (axial direction) of the electrolytic capacitors 12 is referred to as the X direction. Further, the direction in which the electrolytic capacitors 12 are configured in parallel is referred to as the Y direction, and the direction perpendicular to both the X direction and Y direction is referred to as the Z direction. Arrows indicating the X direction, Y direction, and Z direction are marked at appropriate locations in the drawings.

On the upper surface of the first substrate 11, positive-side circuit terminals and negative-side circuit terminals (not shown), which serve as power input portions from the battery, are mounted. These circuit terminals are configured near the end portions on two sides of the first substrate 11 in the Y direction. The battery-side bus bars 17A and 17B, which serve as electrodes for conducting electricity, are connected to the positive-side circuit terminals and the negative-side circuit terminals on the first substrate 11, respectively.

The battery-side bus bars 17A and 17B are both formed by bending a long plate-shaped conductive metal plate in the longitudinal direction into a hat-like shape. For each battery-side bus bar 17A and 17B, one end side in the longitudinal direction is formed as a terminal fixing portion 17Aa and 17Ba to be attached to the upper surface of the case 10 on one end side in the X direction, and the other end side in the longitudinal direction is formed as a circuit fixing portion 17Ab and 17Bb to be connected to the aforementioned positive-side circuit terminal and negative-side circuit terminal on the first substrate 11. Further, the central region in the longitudinal direction of each battery-side bus bar 17A and 17B is formed as a bending portion 17Ac and 17Bc that is bent toward the upper side in an approximately U-shape. The battery-side bus bars 17A and 17B are fixed to the case 10 and the first substrate 11 with the terminal fixing portions 17Aa and 17Ba and circuit fixing portions 17Ab and 17Bb thereof such that the longitudinal direction thereof aligns with the X direction.

Further, on the upper surface of the first substrate 11, three output-side circuit terminals (not shown) for U-phase, V-phase, and W-phase, which serve as power output portions to the motor, are mounted. These output-side circuit terminals are configured in the central region of the first substrate in the Y direction, spaced substantially equally in the Y direction. The motor-side bus bars 18A, 18B, and 18C, which serve as electrodes for conducting electricity, are connected to each of these output-side circuit terminals, respectively.

The motor-side bus bars 18A, 18B, and 18C are formed, similar to the battery-side bus bars 17A and 17B, by bending a long plate-shaped conductive metal plate in the longitudinal direction into a hat-like shape. For each motor-side bus bar 18A, 18B, and 18C, one end side in the longitudinal direction is formed as a terminal fixing portion 18Aa, 18Ba, and 18Ca to be attached to the upper surface of the case 10 on one end side in the X direction, and the other end side in the longitudinal direction is formed as a circuit fixing portion 18Ab, 18Bb, and 18Cb to be connected to each of the aforementioned output-side circuit terminals on the first substrate 11. The central region in the longitudinal direction of each motor-side bus bar 18A, 18B, and 18C is formed as a bending portion 18Ac, 18Bc, and 18Cc that is bent toward the upper side in a substantially U-shape. Each motor-side bus bar 18A, 18B, and 18C is fixed to the case 10 and the first substrate 11 with the terminal fixing portion 18Aa, 18Ba, and 18Ca and the circuit fixing portion 18Ab, 18Bb, and 18Cb thereof such that the longitudinal direction thereof aligns with the X direction.

The three motor-side bus bars 18A, 18B, and 18C are configured in a single row side by side along the Y direction. The three motor-side bus bars 18A, 18B, and 18C are configured at equal intervals in the Y direction. One battery-side bus bar 17A is configured adjacent to the outer side of one end side in the alignment direction of the three motor-side bus bars 18A, 18B, and 18C, while the other battery-side bus bar 17B is configured adjacent to the outer side of the other end side in the alignment direction of the three motor-side bus bars 18A, 18B, and 18C. Consequently, the pair of battery-side bus bars 17A and 17B and the three motor-side bus bars 18A, 18B, and 18C are arranged in a single row side by side along the Y direction. The terminal fixing portions 17Aa, 17Ba, 18Aa, 18Ba, and 18Ca of the battery-side bus bars 17A and 17B and the motor-side bus bars 18A, 18B, and 18C are aligned in a single row along the Y direction at one end side of the case 10 in the X direction.

The second substrate 14 is a printed wiring board (PWB) on which electronic components are mounted. The circuit printed on the second substrate 14 is connected to the circuit on the first substrate 11 through the inter-substrate connector 21 (see FIG. 2). Further, a signal connector 22 is held between the case 10 and the upper cover (not shown). A plurality of signal terminals protruding from the signal connector 22 are also connected to the circuit on the second substrate 14.

The second substrate 14 is formed in a substantially rectangular shape as shown in FIG. 1. One edge of the second substrate 14 in the X direction is fixed to the case 10 (base block 20) through a pair of pillar portions 13A protruding from the case 10. The pair of pillar portions 13A are configured apart from each other in the Y direction, and each penetrates the second substrate 14 in the up and down direction. The upper surface of each pillar portion 13A supports one edge of one side of the second substrate 14 in the X direction. In this state, the edge of one side of the second substrate 14 in the X direction is fastened and fixed to the upper end portion of each pillar portion 13A by fixing screws 45.

The other side of the second substrate 14 in the X direction is fixed to the case 10 through two pairs of pillar portions 13B and 13C protruding from the case 10. The edge of the other side of the second substrate 14 in the X direction is placed on the upper surface of one pair of pillar portions 13C, and in this state, the edge is fixed to the upper end portion of each pillar portion 13C by fixing screws 46. Further, another pair of pillar portions 13B penetrates the second substrate 14 in the up and down direction, and in this state, the pillar portions 13B are fitted into the fitting holes 23 of the second substrate 14.

On the lower surface of the second substrate 14, near one side in the X direction (at the end portion of the extending direction), three Hall ICs 40, which are magnetic detection elements incorporating Hall elements, are attached. One Hall IC 40 is configured below the second substrate 14, facing the bending portion 17Ac of one battery-side bus bar 17A (for example, the positive pole side bus bar). This Hall IC 40 faces the upper surface of the bending portion 17Ac of the battery-side bus bar 17A with a minute gap in between. This Hall IC 40 detects the magnetic force generated in response to the direct current from the battery flowing through the battery-side bus bar 17A. The detection circuit determines the current value flowing through the battery-side bus bar 17A based on this detected magnetic force.

Another Hall IC 40 is configured below the second substrate 14, facing the bending portion 18Ac of the motor-side bus bar 18A at one end side of the alignment direction. This Hall IC 40 faces the upper surface of the bending portion 18Ac of the motor-side bus bar 18A with a minute gap in between. This Hall IC 40 detects the magnetic force generated in response to the alternating current flowing from the power control circuit 16 to the motor-side bus bar 18A. The detection circuit determines the current value flowing through the motor-side bus bar 18A based on this detected magnetic force.

Further, the remaining one Hall IC 40 is configured below the second substrate 14, facing the bending portion 18Cc of the motor-side bus bar 18C at the other end side of the alignment direction. This Hall IC 40 faces the upper surface of the bending portion 18Cc of the motor-side bus bar 18C with a minute gap in between. This Hall IC 40 detects the magnetic force generated in response to the alternating current flowing from the power control circuit 16 to the motor-side bus bar 18C. The detection circuit determines the current value flowing through the motor-side bus bar 18C based on this detected magnetic force.

In the present embodiment, no Hall IC 40 is provided for detecting the current flowing through the central motor-side bus bar 18B. The current value of the current flowing through the central motor-side bus bar 18B is calculated based on the detected values of the currents flowing through the motor-side bus bars 18A and 18C on two sides. Further, a magnetic shield member 50, such as permalloy, is attached around the bending portion 18Bc of the central motor-side bus bar 18B. This magnetic shield member 50 is intended to prevent the magnetic field caused by the current flowing through the central motor-side bus bar 18B from affecting the detection results of the Hall ICs 40.

It is noted that, in the present embodiment, although Hall ICs 40 are used, which include Hall elements and amplification circuits packaged together, the Hall elements and amplification circuits may be configured separately. In this case, at least the Hall elements are configured near the corresponding bus bars. Further, the magnetic detection elements are not limited to Hall elements. The magnetic detection elements may be other elements as long as they are capable of detecting the magnetic field generated in response to the current flowing through the corresponding bus bars (electrodes).

Here, the installation portions for the three Hall ICs 40 mentioned above are all configured near the support portions 14*a* of the second substrate 14, which are supported by the pillar portions 13A at the edges (end portions in the extending direction) of the second substrate 14. In the present embodiment, the support portions 14*a* at the edges of the second substrate 14 are formed by the clamping portions consisting of the upper end surfaces of each pillar portion 13A and the head portions of the fixing screws 45. Further, the three Hall ICs 40 configured at the edge of the second substrate 14 are arranged in a single row along the edge (along the Y direction).

The positional relationship between each pillar portion 13A and the bus bars is as follows. One of the pillar portions 13A is configured in a substantially middle position between the motor-side bus bar 18A at one end side of the alignment direction and the one battery-side bus bar 17A adjacent to the motor-side bus bar 18A. As a result, the Hall IC 40 configured facing the upper surface of the bending portion 18Ac of the motor-side bus bar 18A and the Hall IC 40 configured facing the upper surface of the bending portion 17Ac of the battery-side bus bar 17A are located at substantially equal distances from the support portion 14*a* supported by one of the pillar portions 13A.

The other pillar portion 13A is configured in a substantially middle position between the motor-side bus bar 18C at the other end side of the alignment direction and the other battery-side bus bar 17B adjacent to the motor-side bus bar 18C. The distance from the Hall IC 40 configured facing the upper surface of the bending portion 18Cc of the motor-side bus bar 18C to the support portion 14*a* supported by the other pillar portion 13A is substantially equal to the distance from the Hall IC 40 on the motor-side bus bar 18A side to the support portion 14*a* supported by one of the pillar portions 13A.

These distances (the distances from each support portion 14*a* to the nearby Hall ICs 40) are set to ensure that the vibration amplitude at the installation portions of the Hall ICs 40 remains within an allowable range in response to external vibration input. The term "allowable range" here refers to a range within which the magnetic field (current) detection values obtained by the Hall ICs 40 have an allowable error range. Further, in the present embodiment, the external input vibration is assumed to be the input vibration experienced when the motor control device 1 is mounted in a vehicle.

Effects of the Embodiment

As described above, in the motor control device 1 of the present embodiment, the Hall ICs 40 (magnetic detection elements) are configured near the support portions 14*a* supported by the pillar portions 13A at the end portions in the extending direction of the second substrate 14. As a result, in the motor control device 1 of the present embodiment, even in response to external vibration input, fluctuations in the separation distance between the electrodes for current conduction (the battery-side bus bar 17A and the motor-side bus bars 18A and 18C) and the Hall ICs 40 (magnetic detection elements) may be suppressed.

In other words, although the central region of the second substrate 14 tends to experience large amplitude vibrations in response to external vibration input, the end portions of the second substrate 14 in the extending direction thereof, which are supported by the pillar portions 13A, do not vibrate with large amplitude even in response to external vibration input. As a result, the Hall ICs 40 (magnetic detection elements) configured near the support portions 14*a* supported by the pillar portions 13A at the end portions of the second substrate 14 in the extending direction thereof do not vibrate significantly even in response to external vibration input. Consequently, the motor control device 1 of the present embodiment may suppress fluctuations in the separation distance between the electrodes for current conduction (bus bars) and the Hall ICs 40 (magnetic detection elements) even in response to external vibration input.

Thus, by adopting the motor control device of the present embodiment, the detection accuracy of the current flowing through the electrodes (bus bars) may be improved consistently. Consequently, this may contribute to the United Nations' Sustainable Development Goals (SDGs), specifically Goal 7 "Ensure access to affordable, reliable, sustainable and modern energy for all" and Goal 8 "Promote sustained, inclusive and sustainable economic growth, full and productive employment and decent work for all".

Furthermore, in the motor control device 1 of the present embodiment, the bus bars (battery-side bus bar 17A, motor-side bus bars 18A and 18C) serving as electrodes for current conduction include bending portions 17Ac, 18Ac, and 18Cc that are provided near the Hall ICs 40 on the second substrate 14. As a result, even in the case where there is a large separation distance between the fixing portion of the bus bars and the second substrate 14, by positioning the bending portions 17Ac, 18Ac, and 18Cc of the bus bars close to the second substrate 14, the separation distance between the bus bars (electrodes) to be detected and the Hall ICs 40 may be sufficiently reduced. Consequently, by adopting this configuration, the detection accuracy of the Hall ICs 40 may be further improved.

Further, in the motor control device 1 of the present embodiment, a plurality of Hall ICs 40 are arranged in a row along one edge in the extending direction of the second substrate 14, and this edge of the second substrate 14 is fixed to the case 10 (base block 20) through a plurality of pillar portions 13A. As a result, the plurality of Hall ICs 40 are configured along one edge of the second substrate 14, which has increased rigidity due to the plurality of pillar portions 13A. Consequently, by adopting this configuration, fluctuations in the separation distance between the plurality of Hall ICs 40 and the opposing bus bars (battery-side bus bar 17A, motor-side bus bars 18A and 18C) may be efficiently suppressed.

Furthermore, in the motor control device 1 of the present embodiment, the battery-side bus bars 17A and 17B are configured on the outer sides in the alignment direction of the three motor-side bus bars 18A, 18B, and 18C arranged in a row. Then, the Hall ICs 40 are configured near one battery-side bus bar 17A and near each of the motor-side bus bars 18A and 18C on the outer sides among the three motor-side bus bars 18A, 18B, 18C in the alignment direction. As a result, the input current from the battery may be detected by the Hall IC 40 configured near one battery-side bus bar 17A, and two phases of the output current of the three-phase output current to the motor may be detected by the two Hall ICs 40 configured near the two motor-side bus bars 18A and 18C on the outer sides in the alignment direction. Further, the remaining one phase of the motor output current may be calculated based on the detection values from the two Hall ICs 40 configured near the two motor-side bus bars 18A and 18C on the outer sides in the alignment direction. Thus, by adopting this configuration of the motor control device 1, the input current and the output current may be reliably detected using the minimum necessary number of Hall ICs 40. Consequently, miniaturization and weight reduction of the current detection section may be achieved.

Further, in the motor control device 1 of the present embodiment, one of the pillar portions 13A is configured in a substantially middle position between one motor-side bus bar 18A on the outer side in the alignment direction and the one battery-side bus bar 17A adjacent to the motor-side bus bar 18A. Then, the other pillar portion 13A is configured in a substantially middle position between the other motor-side bus bar 18C on the outer side in the alignment direction and the battery-side bus bar 17B adjacent to the motor-side bus bar 18C. As a result, the two pillar portions 13A supporting one edge of the second substrate 14 may efficiently suppress fluctuations in both the Hall ICs 40 for detecting input current and the Hall ICs 40 for detecting output current. Consequently, by adopting this configuration, the support rigidity of the second substrate 14 may be sufficiently ensured while reducing the number of pillar portions 13A protruding from the base block 20, thereby achieving further miniaturization and weight reduction of the entire device.

It should be noted that the present invention is not limited to the above-mentioned embodiment, and various design changes are possible within the scope of the present invention. For example, in the above-described embodiment, although magnetic detection elements (Hall ICs 40) are configured opposite to two motor-side bus bars 18A and 18C respectively, the magnetic detection elements (Hall ICs 40) may be configured opposite to each of the three motor-side bus bars 18A, 18B, and 18C.

Further, in the above-described embodiment, although the power control circuit 16 is configured with components mounted on the first substrate 11 and the electrolytic capacitor 12, a part of the power control circuit 16 may be provided on the second substrate 14.

Further, in the above-described embodiment, although the electrodes for conducting electricity are configured with bus bars, the electrodes for conducting electricity are not limited to bus bars. The electrodes for conducting electricity may be, for example, wire-shaped or block-shaped, as long as they are capable of conducting electricity.

Furthermore, in the above-described embodiment, although a pair of pillar portions 13A are configured to support the end portion of the second substrate 14 (substrate) where the Hall ICs (magnetic detection elements) are located, the number of these pillar portions 13A is not limited to two. The number of pillar portions 13A may be three or more, or may be one.

Further, in the above-described embodiment, although the Hall ICs (magnetic detection elements) are configured only at one end portion (X-direction end portion) in the extending direction of the second substrate 14 (substrate), the Hall ICs (magnetic detection elements) may be configured at the other end portion in the extending direction of the second substrate 14 (substrate) as well. In this case, the Hall ICs (magnetic detection elements) configured at the other end portion in the extending direction of the second substrate 14 (substrate) may be located in the vicinity of a support portion provided by any of the pillar portions.

Further, in the above-described embodiment, bending portions 17Ac, 17Bc, 18Ac, 18Bc, and 18Cc are provided on the battery-side bus bars 17A and 17B and the motor-side bus bars 18A, 18B, and 18C, respectively. However, in the case where each bus bar may be sufficiently brought close to the corresponding Hall IC (magnetic detection element), the bending portions 17Ac, 17Bc, 18Ac, 18Bc, and 18Cc are not necessarily required to be provided.

What is claimed is:

1. A motor control device, comprising:

a base block, on which at least a part of a power control circuit is configured;

a pillar portion, protruding from the base block;

a substrate, fixed to the base block through the pillar portion;

an electrode for current conduction, connected to the power control circuit; and a magnetic detection element, attached to a position proximate to the electrode of the substrate and configured to detect a magnetic field caused by a current flowing through the electrode, wherein the magnetic detection element is configured in a vicinity of a support portion by the pillar portion at an end portion in an extending direction of the substrate.

2. The motor control device according to claim 1, wherein the electrode is constituted by a bus bar fixed to the base block, and a bending portion that is bent to be proximate to the magnetic detection element is provided on a part of the bus bar.

3. The motor control device according to claim 2, wherein a plurality of electrodes are provided, a plurality of magnetic detection elements are provided in a single row along one edge in the extending direction of the substrate, and the one edge of the substrate is fixed to the base block through a plurality of the pillar portions.

4. The motor control device according to claim 1, wherein a plurality of electrodes are provided, a plurality of magnetic detection elements are provided in a single row along one edge in the extending direction of the substrate, and the one edge of the substrate is fixed to the base block through a plurality of the pillar portions.

5. The motor control device according to claim 4, wherein the electrodes comprise:

a pair of battery-side bus bars, connected to a battery; and three motor-side bus bars, connected to a three-phase power supply portion of a motor, and wherein the battery-side bus bars are respectively configured on outer sides in an alignment direction of the three motor-side bus bars arranged side by side, and the magnetic detection elements are configured in positions proximate to one of the battery-side bus bars and in positions proximate to each of the motor-side bus bars on outer sides in the alignment direction among the three motor-side bus bars.

6. The motor control device according to claim 5, wherein the pillar portions are respectively configured in a substantially middle position between one of the motor-side bus bars on the outer sides in the alignment direction and one of the battery-side bus bars adjacent to the motor-side bus bar and in a substantially middle position between other one of the motor-side bus bars on the outer sides in the alignment direction and other one of the battery-side bus bars adjacent to the motor-side bus bar.

* * * * *